United States Patent [19]

Yabe

[11] 4,010,059
[45] Mar. 1, 1977

[54] TIRE BAND BUILDING DRUM
[75] Inventor: Toshinori Yabe, Kodaira, Japan
[73] Assignee: Bridgestone Tire Company Limited, Tokyo, Japan
[22] Filed: Oct. 10, 1975
[21] Appl. No.: 621,611
[30] Foreign Application Priority Data
  Oct. 11, 1974  Japan .................... 49-117554
[52] U.S. Cl. .................... 156/420; 156/126
[51] Int. Cl.² .................... B29H 17/14; B29H 17/20
[58] Field of Search .......... 156/414, 415, 416, 417, 156/418, 419, 420, 126; 279/2; 242/72

[56] References Cited

UNITED STATES PATENTS

| | | | |
|---|---|---|---|
| 2,699,198 | 1/1955 | Balzhiser | 156/417 |
| 2,936,813 | 5/1960 | Haase | 156/126 |
| 3,027,289 | 3/1962 | Gitzinger | 156/126 |
| 3,542,624 | 11/1970 | Nadler et al. | 156/416 |
| 3,654,025 | 4/1972 | Winzer et al. | 156/415 |
| 3,837,968 | 9/1974 | Marra | 156/415 |
| 3,915,788 | 10/1975 | Hirata et al. | 156/414 |

FOREIGN PATENTS OR APPLICATIONS

| | | | |
|---|---|---|---|
| 1,237,300 | 3/1967 | Germany | 156/414 |
| 1,198,054 | 8/1965 | Germany | 156/415 |
| 1,209,733 | 1/1966 | Germany | 156/414 |

Primary Examiner—Charles E. Van Horn
Assistant Examiner—John E. Kittle
Attorney, Agent, or Firm—Haseltine, Lake & Waters

[57] ABSTRACT

A tire band building drum for manufacturing a tire band of a carcass structure for a green tire, comprises a drive shaft adapted to be rotatable about a building drum axis and a collapsible drum portion axially covering a predetermined length from the forward end thereof. The collapsible drum portion includes a plurality of first arcuate drum segments circumferentially equi-distantly spaced apart from each other and a plurality of second arcuate drum segments each of which is interposed between the first arcuate drum segments to collectively define the collapsible drum portion surface in a substantially cylindrical form upon building the tire band thereon. The first arcuate drum segments are expanded while the second arcuate drum segments are contracted in inclined relation with the building drum axis for the purpose of facilitating withdrawal of a finished tire band out of the tire band building drum.

5 Claims, 11 Drawing Figures

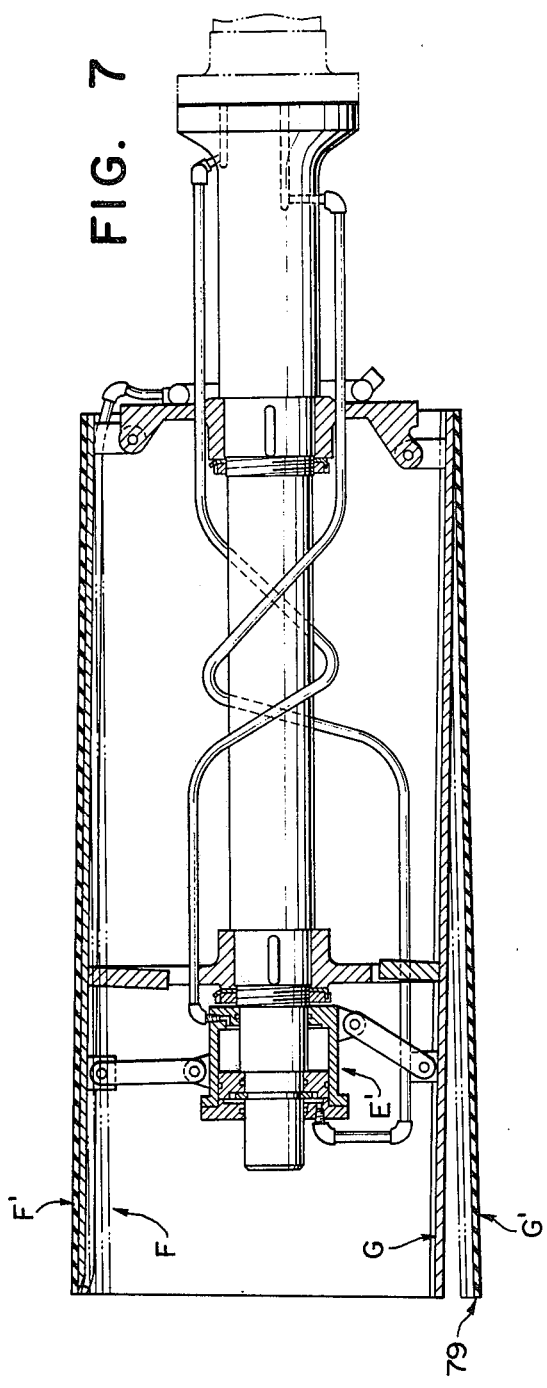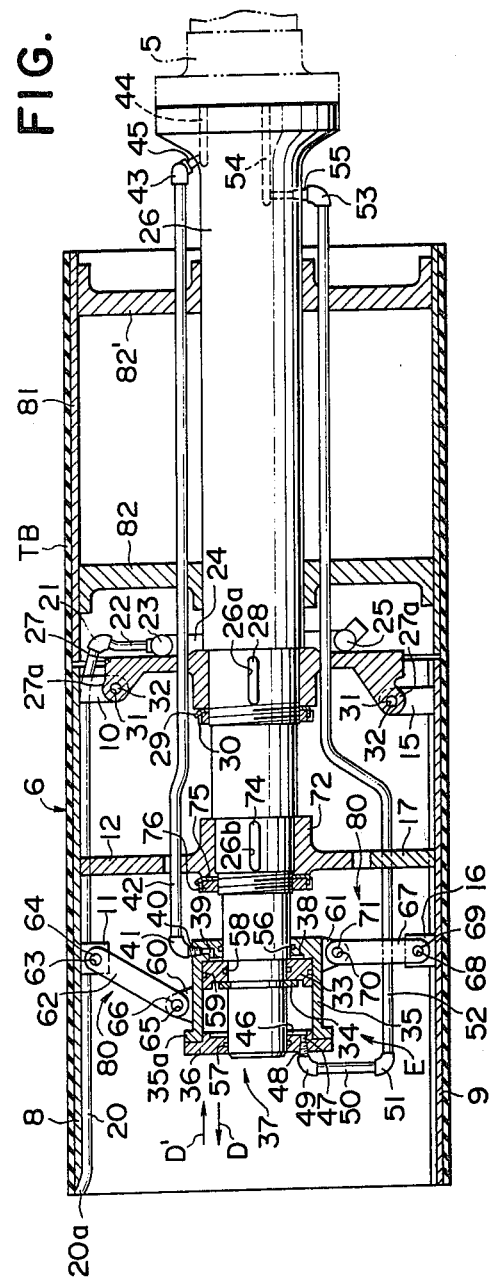

TIRE BAND BUILDING DRUM

The present invention relates in general to the art of pneumatic tire manufacture and in particular to a tire band building drum for manufacturing a tire band of a carcass structure for a green tire.

There has thus far been proposed a green tire manufacturing apparatus which comprises a tire building drum horizontally supported and driven by stationary drive unit for toroidally shaping the green tire, a tire band building drum disposed in opposing and coaxial relation with the tire building drum and horizontally supported and driven by a movable drive unit movable toward and away from the tire building drum, and a tire band withdrawing mechanism movable along the axis of the tire building drum to withdraw or remove a finished tire band out of the tire band building drum and to transfer and mount it on the tire building drum. In order to facilitate the mounting of the tire band on the tire building drum and to eliminate deformation of the tire band in view of qualities or performances, it is required that the tire band be grasped at its circumferentially equi-distant forward end portions and withdrawn from the tire band building drum by the withdrawing mechanism. The finished tire band, however, dangles on the tire band building drum and thus has an upper peripheral portion held in contact with the upper portion of the tire band building drum when it is contracted into the form of a generally cylindrical shape for withdrawal of the tire band. It is, therefore, difficult to grasp the upper portion of the tire band, which makes it impossible to facilitate the mounting of the tire band on the tire building drum with the withdrawing mechanism, resulting in the deformation of the tire band.

It is, therefore, a primary object of the present invention to provide a tire band building drum which overcomes the afore-mentioned drawbacks inherent to the prior tire building drum.

It is another object of the present invention to provide a tire band building drum which makes it easy to grasp the circumferentially equi-distant forward portions without deforming the finished tire band.

It is a further object of the present invention to provide a tire band building drum which enhances tire qualities or performances.

According to the present invention, the above-mentioned objects are attained by a tire band building drum which comprises: a drive shaft adapted to be rotatable about a building drum axis; a collapsible drum portion axially covering a predetermined length from the forward end thereof, said collapsible drum portion including a plurality of first arcuate drum segments circumferentially equi-distantly spaced apart from each other and a plurality of second arcuate drum segments each interposed between said first arcuate drum segments to collectively define said collapsible drum portion surface in a substantially cylindrical form upon building said tire band thereon; a flange member securely mounted on said drive shaft and pivotally supporting at its outer peripheral edge the rear ends of said first and second arcuate drum segments for allowing said first and second arcuate drum segments to pivot around their pivotal points, thereby making said first arcuate drum segments expansible and said second arcuate drum segments contractable in inclined relation with said building drum axis; and drum collapsible means mounted on said drive shaft forwardly of said flange member to rotate said first and second arcuate drum segments and to expand said first arcuate drum segments and to contract said second arcuate drum segments.

The above and other objects, features and advantages of the present invention will become clear from the following particular description of the invention and the appended claims, taken in conjunction with the accompanying drawings which show by way of example a preferred embodiment of the present invention.

In the accompanying drawings:

FIG. 1 is a schematic side elevational view of a conventional green tire manufacturing apparatus showing a tire building drum and a tire band building drum movable toward and away from the tire building drum;

FIGS. 2a and b are enlarged front views of the tire band building drum of an embodiment in accordance with the present invention having a left half showing a plurality of first arcuate drum segments of the tire band building drum is expanded states and a plurality of second arcuate drum segments of the tire band building drum in contracted states and having a right half showing first and second arcuate segments formed into a substantially cylindrical shape for building a carcass structure into a tire band;

Figure 3:
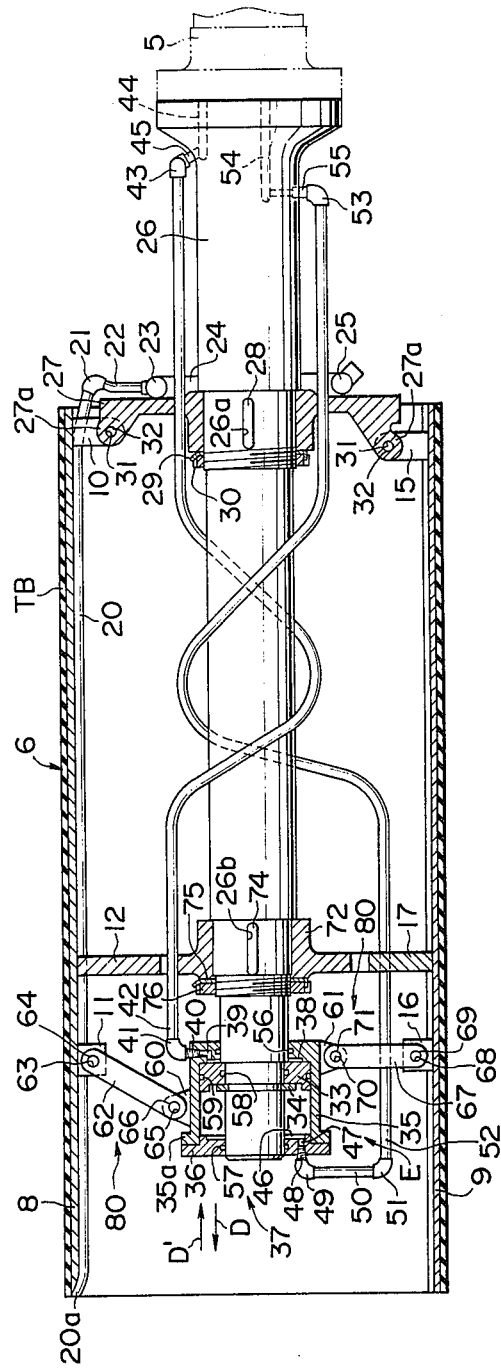
FIG. 3 is a reduced cross-sectional view of the tire band building drum taken along the line X—X in FIG. 2.

FIG. 7 is a reduced cross-sectional view of the tire band building drum similar to FIG. 3 but showing the first arcuate drum segments in expanded states and the second arcuate drum segments in contracted states; and FIG. 8 is a reduced cross-sectional view of another embodiment in accordance with the present invention which is similar to FIG. 3 but shows a non-collapsible drum portion in coaxial connection with the collapsible drum portion.

Figure 1:
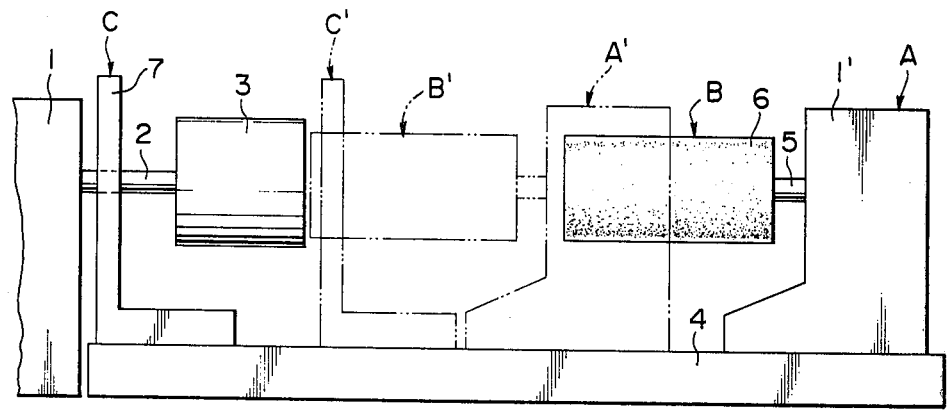

Referring now to the drawings and in particular in FIG. 1, there is shown a stationary drive unit 1 which rotatably supports in a cantilever fashion a horizontal drive shaft 2 on which a collapsible tire building drum 3 is mounted for toroidally shaping a green tire. Below the tire building drum 3 is horizontally disposed at a floor a base structure 4 on which a movable drive unit 1' is slidably mounted to move toward and away from the stationary drive unit 1. The movable drive unit 1' is adapted to rotatably support in a cantilever fashion a horizontal drive shaft 5 on which a collapsible tire band building drum 6 is mounted in opposing and coaxial relation with the tire building drum 3 for building a carcass structure into a tire band. Each of the stationary drive unit 1 and the movable drive unit 1' accommodates therein an electric motor and a reduction gear to drive each of the tire building drum 3 and the tire band building drum 6. The tire building drum 3 has a larger diameter than that of the tire band building drum 6 in their operable states. The movable drive unit 1' is caused to move by a suitable drive arrangement (not shown) from an initial position A as shown in full line to a final position A' as shown in phantom lines and vice versa so that the tire band building drum 6 is moved together with the drive shaft 5 from an initial position B as shown in full line to a final position B' as shown in phantom lines and vice versa. The tire band withdrawing mechanism 7 is slidably mounted on the base structure 4 between the stationary drive unit 1 and the movable drive unit 1' to move along the axis of the tire building drum 3 and has a plurality of grasping assemblies (not shown) at its circumferential equi-distant portions to grasp the circumferential forward end portions of the tire band completed on the tire band building drum 6. The tire band withdrawing mechanism 7 is also moved by a suitable drive arrangement (not shown) from an initial position C as shown in full line to a final position C' as shown in phantom lines and vice versa so as to grasp the circumferential forward end portion of the tire band on the tire band building drum 6 before transferring it onto the tire building drum 3.

In FIGS. 2 to 6, there is shown the tire band building drum 6 which includes eight first arcuate drum segments 8 which are circumferentially equi-distant spaced apart from each other and eight second arcuate drum segments 9 each of which is interposed between the first arcuate drum segments 8 to collectively define a cylindrical surface under an operable condition upon building the tire band thereon. Each of the first arcuate drum segments 8 has a cross-section in the form of a truncated fan shape, while each of the second arcuate drum segments 9 has a cross-section in the form of a truncated mountain shape. As shown particularly in FIGS. 4a and 5a, each of the first arcuate drum segments 8 has at its inner peripheral rear surface a pair of brackets 10 and 10' radially inwardly projected in symmetrical relation to a longitudinal center line thereof and in opposing and parallel relation with each other. At the inner peripheral forward surface of the first arcuate drum segment 8 is attached a pair of first segment brackets 11 and 11' which are radially inwardly projected in symmetrical relation to the longitudinal center line thereof and in opposing and parallel relation with each other. A first radial projection 12 is attached to the inner peripheral intermediate surface of the first arcuate drum segment 8 between the brackets 10 and 10' and the brackets 11 and 11' to project radially inwardly. The brackets 10 and 10' have their radially inner ends respective coaxial bores 13 to receive a pivotal pin which will be described hereinafter, and the brackets 11 and 11' also have at their radially inner ends respective coaxial bores 14 to receive other pivotal pin which will also be described hereinafter. As shown particularly in FIGS. 4b and 5b, each of the second arcuate drum segments 9 also has at its inner peripheral rear surface a pair of brackets 15 and 15' radially inwardly projected in symmetrical relation to a longitudinal center line thereof and in opposing and parallel relation with each other. At the inner peripheral forward surface of the second arcuate drum segment 9 is also attached a pair of second segment brackets 16 and 16' which are radially inwardly projected in symmetrical relation to the longitudinal center line thereof and in opposing and parallel relation with each other. A second radial projection 17 is also attached to the inner peripheral intermediate surface of the second arcuate drum segment 9 between the brackets 15 and 15' and the brackets 16 and 16' to project radially inwardly. The brackets 15 and 15' also have at their radially inner ends respective coaxial bores 18 to receive a pivotal pin which will be described hereinafter, and the brackets 16 and 16' also have at their radially inner ends respective coaxial bores 19 to receive other pivotal pin which will also be described hereinafter. The projection 12 is formed longer than the projection 17.

Figures 2A, 2B:
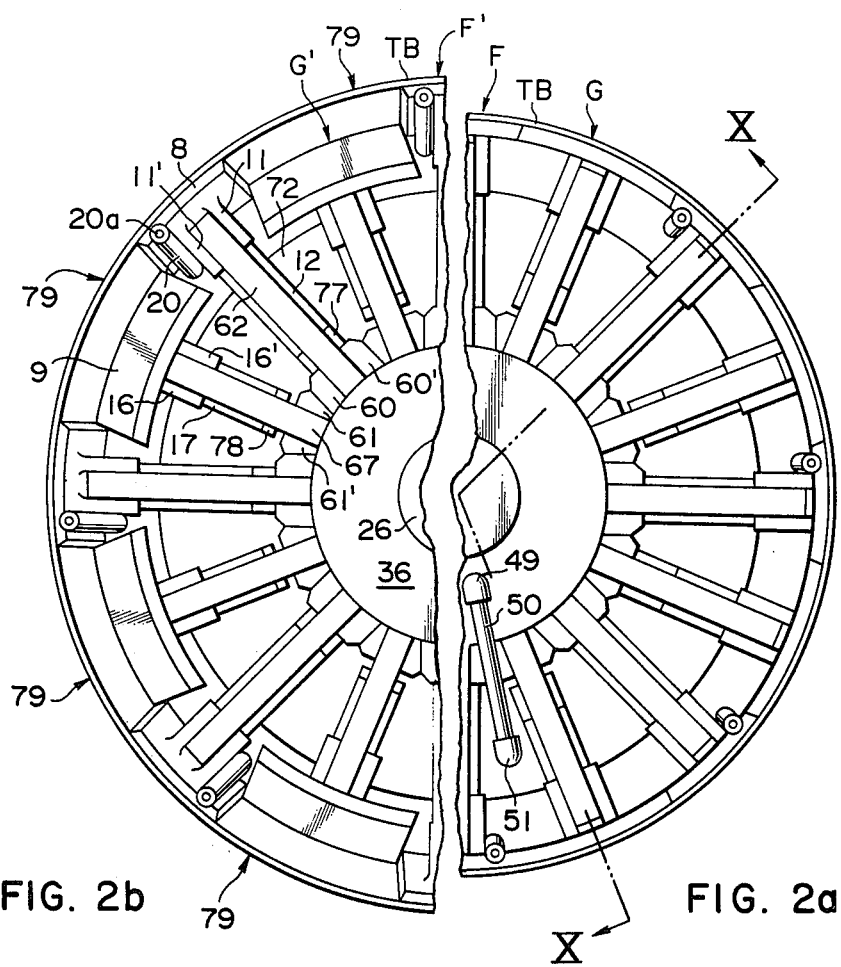
Figure 4A:
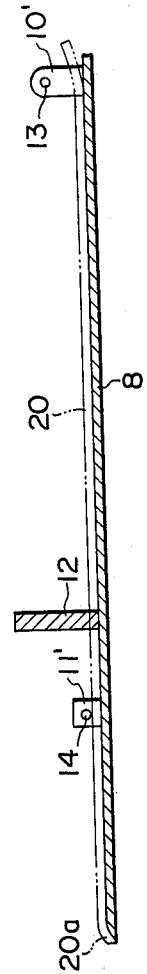
FIG. 4a is an axially cross-sectional view of the first arcuate drum segment of the tire band building drum.
Figure 4B:
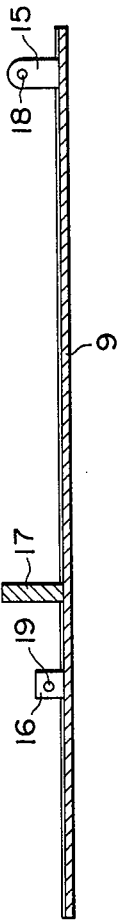
FIG. 4b is an axially cross-sectioned view of the second arcuate drum segment of the tire band building drum.
Figure 5A:
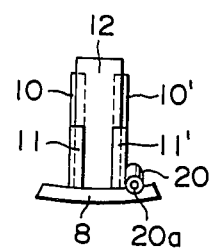
FIG. 5a is a front view of the first arcuate drum segment of the tire band building drum.
Figure 5B:
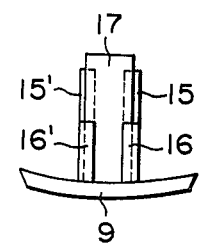
FIG. 5b is a front view of a second arcuate drum segment of the tire band building drum.
Figure 6:
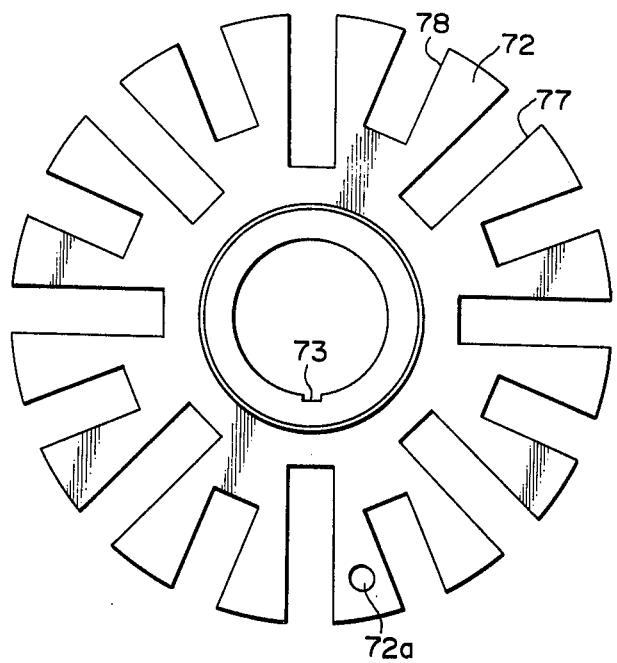
FIG. 6 is an enlarged front view of an additional or fore flange member to be mounted on a drive shaft between a rear flange member and drum collapsing means.

As shown in FIGS. 2, 4a and 5a, an air pipe 20 is attached to the inner peripheral surface of the first arcuate drum segment 8 circumferentially outwardly of the brackets 10' and 11' and has a nozzle 20a opened radially outwardly at the forward inner peripheral end of the first arcuate drum segment 8 so that the tire band is facilitated to be removed out of the tire band building drum 6 by jetting compressed air from the nozzles 20a. Each of the air pipes 20 has a rear end connected through an elbow joint 21 to a radial air pipe 22 which is in turn connected to a port 23 of a ring shaped air pipe 24. On the periphery of the air pipe 24 is provided an air supply port 25 which is connected to a compressed air source provided exteriorly of the tire band building drum 6.

The outer peripheral surfaces of the first and second arcuate drum segments 8 and 9 are coated with polytetrafluoroethylene resin except for one of the second arcuate drum segments 9 so as to facilitate withdrawal of the tire band TB out of the tire band building drum 6 and mounting thereof onto the tire building drum 3 by means of the withdrawing mechanism 7. The outer peripheral surface of the remaining one of the second arcuate drum segments 9 is plated with hard chrome to be made flat so that the forward end of the carcass structure is facilitated to be attached thereonto before the tire band building operation by the tire band building drum 6.

A drive shaft 26 is exchangeably attached to the drive shaft 5 so as to easily exchange a variety of tire band building drums 6 with different diameters. A rear flange member 27 is securely mounted on the drive shaft 26 by means of a key 28 which is received in a key way 26a formed on the drive shaft 26 and in a key way formed on the inner periphery of the rear flange member 27 but not shown. On the drive shaft 26 at the fore surface of the rear flange member 27 are securely mounted on a adapter ring 30 and a washer 29 for preventing the rear flange member 27 from sliding on the drive shaft 26. On the outer peripheral edge of the rear flange member 27 are formed 16 brackets 27a which are interposed between and pivotally connected with the brackets 10 and 10' of the first arcuate drum segments 8 and the brackets 15 and 15' of the second arcuate drum segments 9 by respective pins 32 inserted through the bores 13 of the brackets 10 and 10', the bores 18 of the brackets 15 and 15' and bores 31 formed in the brackets 27a so that the first and second arcuate drum segments 8 and 9 are rockable around the pins 32 to assume respective inclined conditions to the rotational axis of the tire band building drum 6. On the forward portion of the drive shaft 26 is securely mounted by means of a snap ring 34 a piston 33 which has an outer peripheral surface hermetically engaged with a bottomed cylinder 35 which is also hermetically slidably mounted on the drive shaft 26. A cap 36 is fixedly attached to a flange portion 35a formed at the forward end of the cylinder 35 and is hermetically slidably mounted on the forward portion of the drive shaft 26. The piston 33 and the cylinder 35 constitute as a whole a piston cylinder assembly 37. On the inner bottom of the cylinder 35 is formed a recess 38 which is connected with an air passage 39 formed in the bottom wall of the cylinder 35. The air passage 39 is threaded with an air port 40 which is connected with the fore end of an air pipe 42 through an elbow joint 41. The rear end of the air pipe 42 is connected through an elbow joint 43 to an air port 45 which is in threaded engagement with an air conduit 44 formed within the drive shafts 26 and 5. On the inner face of the cap 36 is also formed a recess 46 which is connected with an air passage 47 formed in the cap 36. The air passage 47 is also threaded with an air port 48 which is connected with the fore end of an air pipe 52 through an elbow joint 49, an air pipe 50 and an elbow joint 51. The rear end of the pipe 52 is connected through an elbow joint 53 to an air port 55 which is threaded engagement with an air conduit 54 formed within the drive shafts 26 and 5. The air conduits 44 and 54 are communicated with the compressed air source through a change-over valve which is designed to admit the compressed air either recess 38 or 46 from the compressed air source as well as to discharge the compressed air from either recess 38 or 46 into the atmosphere. A seal ring 56 is received in an annular groove formed in the inner priphery of the bottom wall of the cylinder 35 to prevent the compressed air from discharging through a gap between the peripheral surface of the drive shaft 26 and the inner periphery of the bottom wall of the cylinder 35. A seal ring 57 is also received in an annular groove formed in the inner periphery of the cap 36 due to the same reason. On the inner and outer peripheries of the piston 33 are also formed annular grooves for receiving seal rings 58 and 59, respectively, so as to prevent the compressed air from moving through gaps between the drive shaft 26 and the piston 33, and the cylinder 37 and the piston 33, respectively. On the forward outer peripheral surface of the cylinder 35 are formed in substantially the same circumferential line eight pairs of first cylinder brackets 60 and 60' opposingly to the first segment brackets 11 and 11' of the first arcuate drum segments 8. Each pair of the first cylinder brackets 60 and 60' are disposed in opposing and parallel relation with each other. On the backward outer peripheral surface of the cylinder 35 are formed in substantially the same circumferential line eight pairs of second cylinder brackets 61 and 61' which are opposing to the second segment brackets 16 and 16' of the second arcuate drum segments 9 and which are located in staggered arrangement with the first cylinder brackets 60 and 60'. Each pair of the second cylinder brackets 61 and 61' are also disposed in opposing and parallel relation with each other. The brackets 60 and 61' have coaxial bores to be inserted by pivotal pins which will be described hereinafter, while the brackets 61 and 61' also having coaxial bores to be inserted by pivotal pins which will be described hereinafter.

Eight first link members 62 each has a radially outer end inserted between each pair of the first segment brackets 11 and 11' and pivotally connected to the first segment brackets 11 and 11' through a pivotal pin 64 inserted through the coaxial bores 14 of the first segment brackets 11 and 11', and a bore 63 formed at the radially outer end of the first line member 62. The radially inner end of each of the first link member 62 is inserted between each pair of the first cylinder brackets 60 and 60' and pivotally connected to the first cylinder brackets 60 and 60' through a pivotal pin 66 inserted through the coaxial bores of the first cylinder brackets 60 and 60', and a bore 65 formed at the radially inner end of the first link member 62. On the other hand, eight second link members 67 each has a radially outer end inserted between each pair of the second segment brackets 16 and 16' and pivotally connected to the second segment brackets 16 and 16' through a pivotal pin 69 inserted through the coaxial bores 19 of the second segment brackets 16 and 16', and a bore 68 formed at the radially outer end of the second link member 67. The radially inner end of each of the second link member 67 is inserted between each pair of the second cylinder brackets 61 and 61' and pivotally connected to the second cylinder brackets 61 and 61' through a pivotal pin 71 inserted through the coaxial bores of the second cylinder brackets 61 and 61', and a bore 70 formed at the radially inner end of the second link member 67. Each of the first link members 62 has a larger length than that of each of the second link member 67. The first and second link members 62 and 67 constitute as a whole a link mechanism 80. The compressed air is introduced into the recess 38 through the air conduit 44, the air pipe 45, the elbow joint 43, the air pipe 42, the elbow joint 41, the air port 40 and the air passage 39 from the compressed air source so that the cylinder 35 is caused to move in a direction shown by an arrow D'. As a result of this, the first arcuate drum segments 8 are swung around the pins 32 to assume expanded conditions, and the second arcuate drum segments 9 are concurrently swung around the pins 32 to assume contracted conditions as shown in FIG. 7. When the compressed air is in turn introduced into the recess 46 through the air conduit 54, the air pipe 55, the elbow joint 53, the air pipe 52, the elbow joint 51, the air pipe 50, the elbow joint 49, the air port 48 and the air passage 47 from the compressed air source, the clyinder 55 is caused to move in the direction as shown by an arrow D so that the first and second arcuate drum segments 8 and 9 resume the conditions as shown in FIG. 3. The piston cylinder assembly 37 and the link mechanism 80 therefore constitute as a whole drum collapsing means to expand the first arcuate segments 8 and contract the second arcuate drum segments 9.

A fore flange member 72 is securely mounted on the drive shaft 26 between the cylinder 35 and the rear flange member 27 by means of a key 74 which is received in a key way 26b formed on the drive shaft 26 and a key way 73 (see FIG. 6) formed on the inner periphery of the fore flange member 72. On the drive shaft 26 at the fore surface of the fore flange member 72 are securely mounted an adapter ring 76 and a washer 75 for preventing the fore flange member 72 from sliding on the drive shaft 26. As particularly shown in FIG. 6, the fore flange member 72 has eight first radial grooves 77 substantially equi-angularly spaced apart from each other and slidably receiving the respective first radial projections 12 of the first arcuate drum segments 8 and eight second radial grooves 78 formed between the first radial grooves 77 and slidably receiving the respective second radial projections 17 of the second arcuate drum segments 9 to reinforce driving connection of the link mechanism 80 between the drive shaft 26 and the first and second arcuate drum segments 8 and 9 upon rotation of the tire band building drum 6. Each of the first radial grooves 77 is formed deeper than each of the second radial grooves 78. The fore flange member 72 has an aperture 72a through which the air pipe 52 is inserted. The air pipe 42 is adapted to be inserted through the bottom portion of one of the first radial grooves 77.

The operation to build the tire band in the apparatus thus constracted and arranged with now be described with reference to FIGS. 1 to 7.

Before starting the operation, the movable drive unit 1' and the tire band building drum 6 are stationed in the initial positions A and B remotest from the stationary drive unit 1 and the tire building drum 3, respectively. The tire band withdrawing mechanism 7 is also held in the initial position C remotest from the tire band building drum 6. On the other hand, tire band building drum 6 is maintained in a condition having its peripheral surface in the form of a substantially cylindrical shape.

Under these conditions, a carcass structure made of rubberized fabric cord plies is supplied to the tire band building drum 6 from a servicer arranged opposingly to the tire band building 6 but not shown in the drawings. At this instance, the forward end of the carcass structure is adhered or attached to the hard chrome plated second arcuate drum segment 9. The tire band building drum 6 is then rotated by the electric motor in the movable drive unit 1' so that the carcass structure is forced to be withdrawn from the servicer and wound or wrapped around the tire band building drum 6. After a predetermined length of the carcass structure is wrapped on the tire band building drum 6 and cut by a suitable cutter, it is stitched by a suitable stitching arrangement to build the tire band TB. When the tire band TB has been built on the tire band building drum 6 in the previous manner, the tire band building 6 is stopped.

Thereafter, the compressed air is introduced into the recess 38 from the compressed air source through the air conduit 44, the air port 45, the elbow joint 43, the air pipe 42, the elbow joint 41, the air port 40 and the air passage 39, while the compressed air is discharged from the recess 46 into the atmosphere through the air passage 47, the air port 48, the elbow joint 49, the air pipe 50, the elbow joint 51, the air pipe 52, the elbow joint 53, the air port 55 and the air conduit 54, with the result that the cylinder 35 is moved on the drive shaft 26 in a direction shown by the arrow D' to assume a final position E' as shown in FIG. 7 from an initial position E as shown in FIG. 3. The movement of the cylinder 35 causes the first arcuate drum segments 8 to radially outwardly swing about the pivotal pins 32 through the first link members 62 so that the first arcuate drum segments 8 are expanded from the initial states F to the final states F' in inclined relation with the rotational axis of the drive shaft 26 as particularly shown in FIGS. 2 and 7. Simultaneously, the second arcuate drum segments 9 are radially inwardly swung about the pivotal pins 32 through the second link members 67 so that the second arcuate drum segments 9 are contracted from the initial states G to the final states G' in inclined relation with the rotational axis of the drive shaft 26 as particularly shown in FIGS. 2 and 7. At this instance, the first radial projections 12 of the first arcuate drum segments 8 and the second radial projections 17 of the second arcuate drum segments 9 are allowed to slide radially outwardly and inwardly in the first and second radial grooves 77 and 78, respectively.

Under these conditions, there are formed eight circumferential portions 79 to be grasped by the withdrawing mechanism 7 at the forward circumferential end of the finished tire band TB on the tire band building drum 6 as shown in FIG. 2. The expanded and contracted tire band building drum 6 is then moved on the base structure 4 together with the movable drive unit 1' by the previously mentioned drive arrangement to the final position B' from the initial position B as shown in FIG. 1. Following the movement of the tire band building drum 6, the tire band withdrawing mechanism 7 is caused to move by the previously mentioned drive arrangement to the final position C' from the initial position C. The withdrawing mechanism 7 then grasps the eight circumferential portions 79 on the forward circumferential end of the finished tire band TB and is thereafter moved to the initial position C from the final position C' while grasping the eight circumferential portions 79 of the finished tire band TB.

Shortly before the movement of the withdrawing mechanism 7, the compressed air, which is introduced from the compressed air source through the air supply port 25, the air pipe 24, the air supply port 23, the air pipe 22, the elbow pipe 21 and the air pipe 20, is radially outwardly jetted from the nozzle 20a of the air pipe 20 at the forward end of each of the first arcuate drum segments 8 to facilitate withdrawal of the finished tire band TB out of the tire band building drum 6. The first and second arcuate drum segments 8 and 9 which have the outer peripheral surfaces coated with polytetrafluoroethylene resin except for one of the second arcuate drum segments 9 having the outer peripheral surface plated with hard chrome make it more easier to withdraw the tire band TB out of the tire band building drum 6.

When the tire band TB has been withdrawn out of the tire band building drum 6, the jetting of the compressed air is stopped. Simultaneously, the compressed air is introduced into the recess 46 from the compressed air source through the air conduit 54, the air port 55, the elbow joint 53, the air pipe 52, the elbow joint 51, the air pipe 50, the elbow joint 49, the air port 48 and the air passage 47, while the compressed air is discharged from the recess 38 into the atmosphere through the air passage 39, the air port 40, the elbow joint 41, the air pipe 42, the elbow joint 43, the air pipe 45 and the air conduit 44, with the result that the cylinder 35 is moved on the drive shaft 26 in a direction shown by the arrow D to resume the initial position E from the final position E'. The first arcuate drum segments 8 are thus caused to radially inwardly swing about the pivotal pins 32 through the first link members 62 and thereby contracted from the final states F' to the initial states F. The second arcuate drum segments 9 are simultaneously caused to radially outwardly swing about the pivotal pins 32 through the second link members 67 and thereby expanded from the final states G' to the initial states G. The first and second arcuate drum segments 8 and 9 are thus formed substantially cylindrical for waiting the subsequent tire band building operation.

When the withdrawing mechanism 7 resumes the initial position C, the tire band TB is completely mounted around the tire building drum 3. The tire band building drum 6 is then moved together with the movable drive unit 1' to the initial position B from the final position B'. Following these operations, the tire building drum 3 on which the tire band TB is mounted is driven for rotation by the electric motor in the stationary drive unit 1 to wrap or wind around itself tire components such as a tread and a breaker ply or plies for production of a green tire. The green tire is removed out of the tire building drum 3 after being shaped and stitched.

A single and complete cycle of operation to build a tire band on the tire band building drum of the present invention has been described. A number of tire bands will be produced through repetition of such cycles.

While it has been described that a whole tire band building drum 6 is constructed only by the first and second arcuate drum segments 8 and 9 which are expansible and contractable, respectively, there may be provided at the rear of the first and second arcuate drum segments 8 and 9 an additional cylindrical drum 81 which is securely supported on a pair of flange members 82 and 82' fixedly mounted on the drive shaft 26 to be either non-expansible or non-contractable as shown in FIG. 8. The additional cylindrical drum 81 is required to have substantially the same diameter of the tire band building drum 6 formed by the first and second arcuate drum segments 8 and 9 and to be in coaxial relation with the tire band building drum 6. It is therefore to be understood that the tire band building drum defined in the claims comprises a collapsible tire band building drum portion which covers a predetermined length from the forward end thereof. While it has been described that the first arcuate drum segments 8 are expanded when the second arcuate drum segments 9 are contracted, either the first arcuate drum segments 8 or the second arcuate drum segments 9 may be so contructed as to be expanded or contracted and the remaining first arcuate drum segments 8 or second arcuate drum segments 9 may be held in non-collapsible states having the diameter upon building the tire band. In this instance, it is possible to grasp the forward circumferential portions of the finished tire band.

Although particular embodiments of the present invention have been shown and described, it will be obvious to those skilled in the art that various changes and modifications may be made without departing from the spirit and scope of the present invention.

What is claimed is:

1. A tire band building drum for manufacturing a tire band of a carcass structure for a green tire, which comprises:

a drive shaft located axially of said drum;
   a collapsible drum portion axially extending over a predetermined length from the forward end thereof, said collapsible drum portion including a plurality of first arcuate drum segments circumferentially equi-distantly spaced apart from each other and a plurality of second arcuate drum segments each interposed between said first arcuate drum segments to collectively define said collapsible drum portion surface in a substantially cylindrical form during building said tire band thereon;
   a flange member securely mounted on said drive shaft and pivotally supporting at its outer peripheral edge the rear ends of said first and second arcuate drum segments for allowing said first and second arcuate drum segments to pivot around their pivotal points thereby making both sets of said first and second arcuate drum segments movable in opposite directions in inclined relation with said drive shaft; and
   drum collapsing means mounted on said drive shaft forwardly of said flange member to rotate with said first and second arcuate segments about said drive shaft and to rotate said first and second arcuate drum segments around their pivotal points.

2. A tire band building drum as set forth in claim 1, which further includes an additional flange member securely mounted on said drive shaft between said flange member and said drum collapsing means and having a plurality of first radial grooves substantially equi-angularly spaced apart from each other and a plurality of second radial grooves formed between said first radial grooves, and in which said first arcuate drum segments of said collapsible drum portion each includes a first radial projection formed to project radially inwardly from its inner peripheral surface and radially slidably received in each of said first radial grooves of said additional flange member, and said second arcuate drum segments of said collapsible drum portion each includes a second radial projection formed to project radially inwardly from its inner peripheral surface and radially slidably received in each of said second radial grooves of said additional flange member.

3. A tire band building drum as set forth in claim 1, in which drum collapsing means includes a piston cylinder assembly and a link mechanism, said piston cylinder assembly including a bottomed cylinder hermetically slidably mounted on said drive shaft and having a pair of opposingly spaced bottom plate members each formed with a port communicated with a fluid source, and a piston securely mounted on said drive shaft within said bottomed cylinder and having its outer periphery hermetically engaged with the inner circumferential wall of said bottomed cylinder, and said link mechanism including a plurality of first link members each having one end pivotally connected to a first segment bracket formed on the inner peripheral surface of each of said first arcuate drum segments and the remaining end pivotally connected to each of first cylinder brackets formed in substantially the same circumferential line on the outer wall at the forward portion of said bottomed cylinder of said piston cylinder assembly, and a plurality of second link members each having one end pivotally connected to a second segment bracket formed on the inner peripheral surface of each of said second arcuate drum segments and the remaining end pivotally connected to each of second cylinder brackets formed in substantially the same circumferential line on the outer wall at the backward portion of said bottomed cylinder of said piston cylinder assembly in staggered relation with said first cylinder brackets, whereby said bottomed cylinder of said piston cylinder assembly are caused to axially move on said drive shaft by alternatively admitting and discharging a fluid into and from said ports of said bottomed plate members of said bottomed cylinder so that both sets of said first and second arcuate drum segments are moved in opposite directions through said first and second link members of said link mechanism.

4. A tire band building drum as set forth in claim 1, which further includes a plurality of air pipes each radially outwardly opened at the forward inner peripheral end of each of said first arcuate drum segments and communicated with an air source to jet compressed air through said air pipes, thereby facilitating removal of a finished tire band from said building drum upon said first arcuate drum segments being expanded and said second arcuate drum segments being contracted.

5. A tire band building drum as set forth in claim 1, in which one of said second arcuate drum segments having an outer peripheral surface plated with hard chrome to facilitate attachment of the forward end of said carcass structure onto said building drum prior to a tire band building operation, and said remaining second arcuate drum segments and said first arcuate drum segments each having an outer peripheral surface coated with polytetrafluoroethylene resin to facilitate withdrawal of said finished tire band out of said tire building drum after said tire band building operation.

* * * * *